US009756271B2

(12) United States Patent
Luo et al.

(10) Patent No.: US 9,756,271 B2
(45) Date of Patent: Sep. 5, 2017

(54) CMOS IMAGE SENSOR, PIXEL UNIT AND CONTROL METHOD THEREOF

(71) Applicant: Brigates Microelectronics (Kunshan) Co., Ltd., Jiangsu (CN)

(72) Inventors: Wenzhe Luo, Jiangsu (CN); Lin Wang, Jiangsu (CN); Li Wang, Jiangsu (CN)

(73) Assignee: BRIGATES MICROELECTRONICS (KUNSHAN) CO., LTD, Jiangsu (CN)

( * ) Notice: Subject to any disclaimer, the term of this patent is extended or adjusted under 35 U.S.C. 154(b) by 162 days.

(21) Appl. No.: 14/889,064

(22) PCT Filed: Jun. 7, 2013

(86) PCT No.: PCT/CN2013/076909
§ 371 (c)(1),
(2) Date: Nov. 4, 2015

(87) PCT Pub. No.: WO2014/183311
PCT Pub. Date: Nov. 20, 2014

(65) Prior Publication Data
US 2016/0088251 A1    Mar. 24, 2016

(30) Foreign Application Priority Data
May 17, 2013    (CN) .......................... 2013 1 0183417

(51) Int. Cl.
*H04N 5/3745*    (2011.01)
(52) U.S. Cl.
CPC .............................. *H04N 5/37452* (2013.01)
(58) Field of Classification Search
CPC .... H04N 5/37452; H04N 5/374; H04N 5/369; H04N 5/3575; H04N 5/357; H01L 27/146; H01L 27/14601; H01L 27/14612
See application file for complete search history.

(56) References Cited

U.S. PATENT DOCUMENTS 6,566,697 B1    5/2003    Fox et al.
7,286,174 B1 *  10/2007   Weale .................... H04N 5/335
                                              250/208.1
(Continued)

FOREIGN PATENT DOCUMENTS

CN    1447586 A    10/2003
CN    101193203 A   6/2008
(Continued)

OTHER PUBLICATIONS

International Search Report dated Feb. 20, 2014 for PCT application No. PCT/CN2013/076909.

*Primary Examiner* — John Lee
(74) *Attorney, Agent, or Firm* — Ohlandt, Greeley, Ruggiero & Perle, LLP

(57) ABSTRACT

A CMOS image sensor, a pixel unit and a control method thereof are provided. The pixel unit includes: a photoelectric conversion unit, an isolation transistor, a storage unit and a reading unit, wherein a first terminal of the isolation transistor is connected to the photoelectric conversion unit, a second terminal of the isolation transistor is connected to the storage unit and the reading unit; and wherein the storage unit comprises a first switch unit, a second switch unit, a first storage capacitor, a second storage capacitor and a reset unit, the first switch unit is adapted for controlling the first storage capacitor to be charged or discharged, the second switch unit is connected to the second storage capacitor and is adapted for controlling the second storage capacitor to be charged or discharged. The pixel unit improves signal-to-noise ratio of image signals generated by the pixel unit.

13 Claims, 4 Drawing Sheets

(56) References Cited

U.S. PATENT DOCUMENTS

| | | | |
|---|---|---|---|
| 2002/0190215 A1* | 12/2002 | Tashiro | H01L 27/14658 250/370.11 |
| 2003/0183745 A1 | 10/2003 | Yang et al. | |
| 2006/0119720 A1 | 6/2006 | Hong | |
| 2006/0139471 A1* | 6/2006 | Lee | H04N 5/3575 348/308 |
| 2006/0192864 A1* | 8/2006 | Mauritzson | H01L 27/14603 348/241 |
| 2006/0261251 A1* | 11/2006 | Fossum | H04N 5/3575 250/208.1 |
| 2007/0222879 A1* | 9/2007 | Glenn | H04N 3/155 348/297 |
| 2008/0122962 A1 | 5/2008 | Shah | |
| 2008/0273106 A1* | 11/2008 | Amini | H03F 3/3022 348/301 |
| 2009/0001255 A1* | 1/2009 | Hong | H01L 27/14609 250/208.1 |
| 2009/0045319 A1* | 2/2009 | Sugawa | H01L 27/14609 250/208.1 |
| 2009/0256060 A1 | 10/2009 | Meynants et al. | |
| 2010/0079632 A1* | 4/2010 | Walschap | H04N 5/37452 348/294 |
| 2011/0128425 A1 | 6/2011 | Schemmann et al. | |
| 2011/0304758 A1* | 12/2011 | Eldesouki | H04N 5/37452 348/308 |
| 2012/0241594 A1* | 9/2012 | Noiret | H04N 5/35536 250/208.1 |
| 2012/0256077 A1* | 10/2012 | Yen | H01L 27/14609 250/208.1 |
| 2013/0032691 A1* | 2/2013 | Cho | H01L 27/14609 250/206 |
| 2016/0088251 A1* | 3/2016 | Luo | H04N 5/37452 250/208.1 |

FOREIGN PATENT DOCUMENTS

| | | |
|---|---|---|
| CN | 102124726 A | 7/2011 |
| CN | 102695010 A | 9/2012 |

* cited by examiner

CMOS IMAGE SENSOR, PIXEL UNIT AND CONTROL METHOD THEREOF

CROSS-REFERENCE TO RELATED APPLICATIONS

The present application is a National Phase Application of International Application No. PCT/CN2013/076909, filed on Jun. 7, 2013, which claims priority to Chinese patent application No. 201310183417.1, filed on May 17, 2013, entitled "CMOS IMAGE SENSOR, PIXEL UNIT AND CONTROL METHOD THEREOF", the entireties thereof are incorporated herein by reference.

BACKGROUND

1. Field of the Disclosure

The present disclosure generally relates to image sensor technology, and more particularly, to a CMOS image sensor, a pixel unit and a method for controlling the pixel unit.

2. Discussion of the Background Art

Image sensors are important parts of digital cameras. According to components they have, the image sensors can be divided into two types: Charge Coupled Device (CCD) image sensors and Complementary Metal-Oxide Semiconductor (CMOS) image sensors. CMOS image sensors have been widely used in different fields, attributed to their outstanding performance such as low power consumption, low cost and good compatibility with standard production line.

According to exposure modes, CMOS sensors can be divided into two types: line-by-line exposure CMOS image sensors and global exposure CMOS image sensors. Generally, a pixel unit of the CMOS image sensor includes a photodiode and a plurality of transistors. According to a number of the transistors they have, the pixel units of the CMOS image sensor can be classified into 3-transistor (3T) type, 4-transistor (4T) type and 5-transistor (5T) type.

According to an American patent with a publication number of U.S. Pat. No. 6,566,697, entitled "Pinned photodiode five transistor pixel", a pixel unit of a 5T-type global exposure CMOS image sensor is disclosed. A structure diagram of the pixel unit is illustrated in FIG. 1. Referring to FIG. 1, the pixel unit of the 5T-type global exposure CMOS image sensor includes one photodiode PPD and five NMOS transistors including a reset transistor M11, an amplifier transistor M12, a selection transistor M13, a transmission transistor M14 and a global reset transistor M15.

A source of the reset transistor M11 serves as a storage node FD (namely, a floating diffusion area) for storing signals temporarily. A drain of the reset transistor M11, a drain of the amplifier transistor M12 and a drain of the global transistor M15 are connected to a first power line Vdd. A positive electrode of the photodiode is connected to a second power line Vss. A voltage provided by the second power line Vss is lower than a voltage provided by the first power line Vdd. Generally, the first power line Vdd provides a power voltage for supplying the CMOS image sensor, and the second power line Vss provides a ground voltage. A source of the selection transistor M13 is adapted for connecting to a column selection line Bitline.

The reset transistor M11 is adapted for resetting the storage node FD before the pixel unit is exposed, so as to raise the storage node FD from a low potential to a predetermined high potential. The global reset transistor M15 is adapted for resetting the photodiode PPD before the pixel unit is exposed. The photodiode PPD is adapted for performing photoelectric conversion and converting optical signals to electrical signals when the pixel unit is exposed. The transmission transistor M14 is adapted for transmitting the electrical signal obtained by the photodiode PPD to the storage node FD. The amplifier transistor M12 adapted for amplifying the electrical signal received from the storage node FD. The selection transistor M13 is adapted for transmitting the amplified electrical signal to the column selection line Bitline.

FIG. 2 illustrates an operation timing diagram of the pixel unit shown in FIG. 1, wherein RST stands for a reset control signal received by a gate of the reset transistor M11, SEL stands for a row selection signal received by a gate of the selection transistor M13, TX stands for a transmission signal received by a gate of the transmission transistor M14, and rst stands for a global reset signal received by a gate of the global reset transistor M15. A working process of the pixel unit shown in FIG. 1 will be described below in conjunction with FIG. 2.

Referring to FIG. 2, at a beginning of an operation period, the reset control signal RST is a high level signal, such that the reset transistor M11 is turned on to reset the storage node FD and raise the storage node FD to a high potential.

At the time of t20, the global reset signal rst is switched from a low level signal to a high level signal, such that the global reset transistor M15 is turned on and the photodiode PPD is reset.

At the time of t21, the global reset signal rst is switched from a high level signal to a low level signal, such that the global reset transistor M15 is turned off, and the photodiode PPD performs photoelectric conversion, and converts optical signals to electrical signals.

At the time of t22, the photodiode PPD finishes photoelectric conversion and the transmission signal TX is switched from a low level signal to a high level signal; such that the transmission transistor M14 is turn on to transmit the electrical signals obtained by the photodiode PPD to the storage node FD. At this time, the signal stored in the storage node FD is an exposure signal Vsig. A time period between t21 and t22 is an exposure period of the photodiode PPD. In the exposure period, the reset control signal RST is switched from a high level signal to a low level signal.

After a period of time when the transmission transistor M14 is turned off, the row selection signal SEL is switched from a low level signal to a high level signal, such that the selection transistor M13 is turned on. At the time of t23, the exposure signal Vsig is read out to the column selection line Bitline.

After the exposure signal Vsig is read out, the reset transistor M11 resets the storage node FD again. After the reset operation, the signal stored in the storage node FD is a reset signal Vrst. At the time of t24, the reset signal Vrst is read out to the column selection line Bitline. A difference between the reset signal Vrst and the exposure signal Vsig is an image signal generated by the pixel unit.

At the time of t25, the reset control signal RST is switched from a low level signal to a high level signal, and the pixel unit starts a new operation period.

After the image signal obtained by the pixel unit shown in FIG. 1 is transmitted through a series of CMOS circuits, reset noises are generated by control pulse signals of the circuits. In order to reduce impacts of the reset noises, a Correlated Double Sampling (CDS) technology is usually employed.

According to an American patent application with a publication number of US20090256060A1, entitled "Pixel array with global shutter", a pixel unit of an 8T type global exposure CMOS image sensor is disclosed. A structure diagram of the pixel unit is illustrated in FIG. 3. Compared with the pixel unit shown in FIG. 1, the pixel unit shown in FIG. 3 reduces the global reset transistor, but adds a first sampling capacitance C12, a second sampling capacitance C22, a first switch transistor M21, a second switch transistor M22, a discharge transistor M23 and an amplifier transistor M24.

FIG. 4 illustrates an operation timing diagram of the pixel unit shown in FIG. 3, wherein SMP1 stands for a first control signal received by a gate of the first switch transistor M21, SMP2 stands for a second control signal received by a gate of the second switch transistor M22, and PC stands for a discharge signal obtained by a gate of the discharge transistor M23. A working process of the pixel unit shown in FIG. 3 will be described below in conjunction with FIG. 4.

Referring to FIG. 4, at a beginning of an operation period, the reset control signal RST is a high level signal, such that the reset transistor M11 is turned on to reset the storage node FD and raise the storage node FD to a high potential. That is, the storage node FD stores a reset signal Vrst.

At the time of t40, both the first control signal SMP1 and the second control signal SMP2 are switched from a low level signal to a high level signal, such that the first switch transistor M21 and the second switch transistor M22 are turned on, the reset signal Vrst is stored in the first sampling capacitance C21 and the second sampling capacitance C22, and both a voltage of the first sampling capacitance C21 and a voltage of the second sampling capacitance C22 are the same as a voltage of the reset signal Vrst.

At the time of t41, the second control signal SMP2 is switched from a high level signal to a low level signal, such that the second switch transistor M22 is turned off. In addition, before the time of t41, the reset control signal RST is switched from a high level signal to a low level signal, such that the reset transistor M11 is turned off.

At the time of t42, the transmission signal TX is switched from a low level signal to a high level signal, such that the transmission transistor M14 is turned on to transmit the electrical signals obtained by the photodiode PPD to the storage node FD. That is, the storage node FD stores an exposure signal Vsig.

At the time of t43, the discharge signal PC is switched from a low level signal to a high level signal, such that the discharge transistor M23 is turned on to reset the first sampling capacitance C21. After the reset operation, the amplifier transistor M12 stores the exposure signal Vsig in the first sampling capacitance C21, the first control signal SMP1 is switched from a high level signal to a low level signal, and the first switch transistor M21 is turned off.

At the time of t44, the reset control signal RST is switched from a low level signal to a high level signal, such that the reset transistor M11 is turn on, and the storage node FD is reset again.

At the time of t45, the row selection signal SEL is switched from a low level signal to a high level signal, such that the selection transistor M13 is turned on, and reset signal Vrst stored in the second sampling capacitance C22 is read out to the column selection line Bitline.

Then, the second control signal SMP2 is switched from a low level signal to a high level signal, such that the second switch transistor M22 is turned on. According to a charge-sharing effect, after the second switch transistor M22 is turn on, a voltage of the first sampling capacitance C21 is equal to a voltage of the second sampling capacitance C22. An electrical signal on the second sampling capacitance C22 is (Vrst-Vsig)/2.

After the second control signal SMP2 is switched from a high level signal to a low level signal, the electrical signal in the second sampling capacitance C22 is read out to the column selection line Bitline. At the time of t46, the row selection signal SEL is switched from a high level signal to a low level signal, and a process for reading the reset signal Vrst and the exposure signal Vsig is finished.

In the process for the pixel unit shown in FIG. 4 reading the reset signal Vrst and the exposure signal Vsig, the first sampling capacitance C21 and the second sampling capacitance C22 shares the exposure signal Vsig, which results in that the useful signal decays a half, Signal to Noise Ratio (SNR) of the image signal generated by the pixel unit is decreased, and the image generated by the CMOS image sensor has a poor quality.

SUMMARY

The present disclosure aims to solve the problem that SNR of the image signal generated by the conventional pixel unit of CMOS image sensor is low.

In order to solve the above problems, a pixel unit of CMOS image sensor is provided in embodiments of the present disclosure. The pixel unit of CMOS image sensor may include: a photoelectric conversion unit, an isolation transistor, a storage unit and a reading unit, wherein a first terminal of the isolation transistor is connected to the photoelectric conversion unit, a second terminal of the isolation transistor is connected to the storage unit and the reading unit, the first terminal is a source of the isolation transistor and the second terminal is a drain of the isolation transistor; and wherein the storage unit includes a first switch unit, a second switch unit, a first storage capacitor, a second storage capacitor and a reset unit, wherein a first terminal of the first switch unit is connected to the first storage capacitor and is adapted for controlling the first storage capacitor to be charged or discharged, a first terminal of the second switch unit is connected to the second storage capacitor and is adapted for controlling the second storage capacitor to be charged or discharged, a second terminal of the first switch unit is connected to a second terminal of the second switch unit and the reading unit, and the reset unit is adapted for providing reset voltages for the first storage capacitor and the second storage capacitor.

In some embodiments, the photoelectric conversion unit includes a photoelectric conversion device, a first transistor, a second transistor and a third transistor, where a first terminal of the first transistor is adapted for connecting to a first power line; where a first terminal of the second transistor is connected to a second terminal of the first transistor, and a second terminal of the second transistor is connected to a first terminal of the photoelectric conversion device; where a second terminal of the photoelectric conversion device is adapted for connecting to a second power line, and a voltage provided by the second power line is lower than a voltage provided by the first power line; and where a first terminal of the third transistor is adapted for connecting to the first power line, a second terminal of the third transistor is connected to the first terminal of the isolation transistor, and a third terminal of the third transistor is connected to the second terminal of the first transistor.

In some embodiments, the reading unit includes an eighth transistor and a ninth transistor, where a first terminal of the eighth transistor is adapted for connecting to the first power line, a second terminal of the eighth transistor is connected to a first terminal of the ninth transistor, and a third terminal of the eighth transistor is connected to the second terminal of the isolation transistor; and where a second terminal of the ninth transistor is adapted for connecting to a column selection line.

In some embodiments, the reset unit includes a fourth transistor, the first switch unit includes a fifth transistor, and the second switch unit includes a sixth transistor, where a first terminal of the fourth transistor is connected to the second terminal of the isolation transistor, and a second terminal of the fourth transistor is adapted for connecting to the second power line; where a first terminal of the fifth transistor is connected to the second terminal of the isolation transistor, and a second terminal of the fifth transistor is connected to a first terminal of the first storage capacitor; where a first terminal of the sixth transistor is connected to the second terminal of the isolation transistor, and a second terminal of the sixth transistor is connected to a first terminal of the second storage capacitor; and where both a second terminal of the first storage capacitor and a second terminal of the second storage capacitor are adapted for connecting to the second power line.

In some embodiments, the reset unit includes a seventh transistor, where a first terminal of the seventh transistor is adapted for connecting to the first power line, and a second terminal of the seventh transistor is connected to the second terminal of the isolation transistor; where a first terminal of the fifth transistor is connected to the second terminal of the isolation transistor, and a second terminal of the fifth transistor is connected to a first terminal of the first storage capacitor; where a first terminal of the sixth transistor is connected to the second terminal of the isolation transistor, and a second terminal of the sixth transistor is connected to a first terminal of the second storage capacitor; and where both a second terminal of the first storage capacitor and a second terminal of the second storage capacitor are adapted for connecting to the second power line.

According to the pixel unit of CMOS image sensor described above, a method for controlling the pixel unit of CMOS image sensor is provided according to one embodiment. The method may include:

at a beginning of an operation period, controlling the first transistor to be turned on, so as to reset the second terminal of the first transistor; and, after the second terminal of the first transistor has been reset, controlling the first transistor to be turned off;

in a first time slot after the first transistor has been turned off, controlling the isolation transistor to be turned on, such that the photoelectric conversion unit and the storage unit are connected;

in the first time slot, controlling the fifth transistor to be turned on in a second time slot, such that the first storage capacitor and the fourth transistor are connected;

in the second time slot, controlling the fourth transistor to be turned on in a third time slot, so as to reset the first storage capacitor; after the first storage capacitor has been reset, controlling the fourth transistor to be turned off, so as to store a reset signal of the second terminal of the first transistor in the first storage capacitor; and, after the reset signal has been stored, controlling the fifth transistor to be turned off;

in a fourth time slot which is in the first time slot and after the fifth transistor being turned off, controlling the second transistor to be turned on, so as to transmit a signal obtain by photoelectric conversion of the photoelectric conversion unit to the second terminal of the first transistor; and, after the signal obtain by photoelectric conversion is transmitted, controlling the second transistor to be turned off;

in a fifth time slot which is in the first time slot and after the second transistor being turned off, controlling the sixth transistor to be turned on, such that the second storage capacitor and the fourth transistor are connected;

in the fifth time slot, controlling the fourth transistor to be turned on in a sixth time slot, so as to reset the second storage capacitor; after the second storage capacitor is reset, controlling the fourth transistor to be turned off, so as to store an exposure signal of the second terminal of the first transistor to the second storage capacitor; and, after the exposure signal has been stored, controlling the isolation transistor to be turned off, such that the photoelectric conversion unit and the storage unit are disconnected;

after the photoelectric conversion unit and the storage unit are disconnected, controlling the first transistor to be turned on, so as to reset the second terminal of the first transistor again;

in a seventh time slot after the isolation transistor is turned off, controlling the ninth transistor to be turned on;

in the seventh time slot, controlling the fourth transistor to be turned on in an eighth time slot, so as to reset a connection node of the fifth transistor and the sixth transistor; and, after the connection node is reset, controlling the fourth transistor to be turned off;

in the seventh time slot and after the fourth transistor is turned off, controlling the fifth transistor to be turned on in a ninth time slot, so as to read the signal stored in the first storage capacitor out to the column selection line; and, after the signal stored in the first storage capacitor has been read out, controlling the fifth transistor to be turned off;

in the seventh time slot and after the fifth transistor has been turned off, controlling the fourth transistor to be turned on in a tenth time slot, so as to reset the connection node of the fifth transistor and the sixth transistor; and, after the connection node is reset, controlling the fourth transistor to be turned off; and in the seventh time slot and after the fourth transistor has been turned off, controlling the sixth transistor to be turned on in an eleventh time slot, so as to read the signal stored in the second storage capacitor out to the column selection line; after the signal stored in the second storage capacitor has been read out, controlling the sixth transistor to be turned off; and, after the sixth transistor is turned off, controlling the ninth transistor to be turned off and ending the operation period.

According to the pixel unit of CMOS image sensor described above, a method for controlling the pixel unit of CMOS image sensor is provided according to another embodiment of the present disclosure. The method may include:

at a beginning of an operation period, controlling the first transistor to be turned on, so as to reset the second terminal of the first transistor; and, after the second terminal of the first transistor has been reset, controlling the first transistor to be turned off;

in a first time slot after the first transistor has been turned off, controlling the isolation transistor to be turned on, such that the photoelectric conversion unit and the storage unit are connected;

in the first time slot, controlling the fifth transistor to be turned on in a second time slot, such that the first storage capacitor and the seventh transistor are connected;

in the second time slot, controlling the seventh transistor to be turned on in a third time slot, so as to reset the first storage capacitor; after the first storage capacitor has been reset, controlling the seventh transistor to be turned off, so as to store a reset signal of the second terminal of the first transistor in the first storage capacitor; and, after the reset signal has been stored, controlling the fifth transistor to be turned off;

in a seventh time slot which is in the first time slot and after the fifth transistor being turned off, controlling the second transistor to be turned on, so as to transmit a signal obtain by photoelectric conversion of the photoelectric conversion unit to the second terminal of the first transistor; and, after the signal obtained by photoelectric conversion is transmitted, controlling the second transistor to be turned off;

in a fifth time slot which is in the first time slot and after the second transistor being turned off, controlling the sixth transistor to be turned on, such that the second storage capacitor and the seventh transistor are connected;

in the fifth time slot, controlling the seventh transistor to be turned on in a sixth time slot, so as to reset the second storage capacitor; after the second storage capacitor is reset, controlling the seventh transistor to be turned off, so as to store an exposure signal of the second terminal of the first transistor to the second storage capacitor; and, after the exposure signal has been stored, controlling the isolation transistor to be turned off, such that the photoelectric conversion unit and the storage unit are disconnected;

after the photoelectric conversion unit and the storage unit are disconnected, controlling the first transistor to be turned on, so as to reset the second terminal of the first transistor again;

in a seventh time slot after the isolation transistor is turned off, controlling the ninth transistor to be turned on;

in the seventh time slot, controlling the seventh transistor to be turned on in an eighth time slot, so as to reset a connection node of the fifth transistor and the sixth transistor; and, after the connection node is reset, controlling the seventh transistor to be turned off;

in the seventh time slot and after the seventh transistor is turned off, controlling the fifth transistor to be turned on in a ninth time slot, so as to read the signal stored in the first storage capacitor out to the column selection line; and, after the signal stored in the first storage capacitor has been read out, controlling the fifth transistor to be turned off;

in the seventh time slot and after the fifth transistor has been turned off, controlling the seventh transistor to be turned on in a tenth time slot, so as to reset the connection node of the fifth transistor and the sixth transistor; and, after the connection node is reset, controlling the seventh transistor to be turned off; and in the seventh time slot and after the seventh transistor has been turned off, controlling the sixth transistor to be turned on in an eleventh time slot, so as to read the signal stored in the second storage capacitor out to the column selection line; after the signal stored in the second storage capacitor has been read out, controlling the sixth transistor to be turned off; and, after the sixth transistor is turned off, controlling the ninth transistor to be turned off and ending the operation period.

According to the pixel unit of CMOS image sensor described above, a CMOS image sensor is also provided according to one embodiment of the present disclosure. The image sensor may include: a row selection circuit and a column selection circuit, wherein the image sensor further includes a pixel array, the pixel array includes a plurality of pixel units described above, and the plurality of pixel units are arranged in an array.

Compared with the conventional pixel units, embodiments of the present disclosure have following advantages: the storage unit includes a first storage capacitor and a second storage capacitor, resetting operation and signal storage operation of the first storage capacitor are controlled by the first switch unit, and resetting operation and signal storage operation of the second storage capacitor are controlled by the second switch unit. In processes for storing the reset signal and the exposure signal, the first storage capacitor is adapted for storing the reset signal, and the second storage capacitor is adapted for storing the exposure signal. In processes for reading out the reset signal and the exposure signal, when the reset signal is read out from the first storage capacitor, the second storage capacitor and the reading unit are disconnected, and when the exposure signal is read out from the second storage capacitor, the first storage capacitor and the reading unit are disconnected. Therefore, in the process for reading out the reset signal and the exposure signal by CDS technology, there is no attenuation occurred to the reset signal and the exposure signal, and SNRs of the signals generated by the pixel unit are improved.

DETAILED DESCRIPTION OF THE PREFERRED EMBODIMENTS

As shown above, in order to reduce impacts of the reset noises, a Correlated Double Sampling (CDS) technology is usually employed to read out the reset signal and the exposure signal of the pixel unit of the CMOS image sensor, so as to obtain an image signal generated by the pixel unit. However, in the pixel unit of the 8T type global exposure CMOS image sensor, the first sampling capacitance C21 and the second sampling capacitance C22 shares the exposure signal in the process for reading the exposure signal, which results in that the useful signal decays a half, and the SNR of the image signal generated by the pixel unit of the CMOS sensor is decreased. Therefore, the inventor of the present disclosure provides a pixel unit of CMOS image sensor by research. In this pixel unit of CMOS image sensor, the SNR of image signals generated by the pixel unit of CMOS image sensor can be improved.

In order to clarify the objects, characteristics and advantages of the disclosure, the embodiments of the present disclosure will be described in detail in conjunction with the accompanying drawings.

In embodiments of the present disclosure, the pixel unit of CMOS image sensor may include: a photoelectric conversion unit, an isolation transistor, a storage unit and a reading unit.

A first terminal of the isolation transistor is connected to a photoelectric conversion unit, and a second terminal of the isolation transistor is connected to the storage unit and the reading unit, where the first terminal and the second terminal of the isolation transistor are a source and a drain of a transistor respectively.

The storage unit includes a first switch unit, a second switch unit, a first storage capacitor, a second storage capacitor and a reset unit. A first terminal of the first switch unit is connected to the first storage capacitor and is adapted for controlling the first storage capacitor to be charged or discharged. A first terminal of the second switch unit is connected to the second storage capacitor and is adapted for controlling the second storage capacitor to be charged or discharged. A second terminal of the first switch unit is connected to a second terminal of the second switch unit and the reading unit. The reset unit is adapted for providing reset voltages for the first storage capacitor and the second storage capacitor.

A structure and a control method of the pixel unit of CMOS image sensor will be described below in detail in conjunction with the accompanying drawings and specific embodiments.

Figure 1:
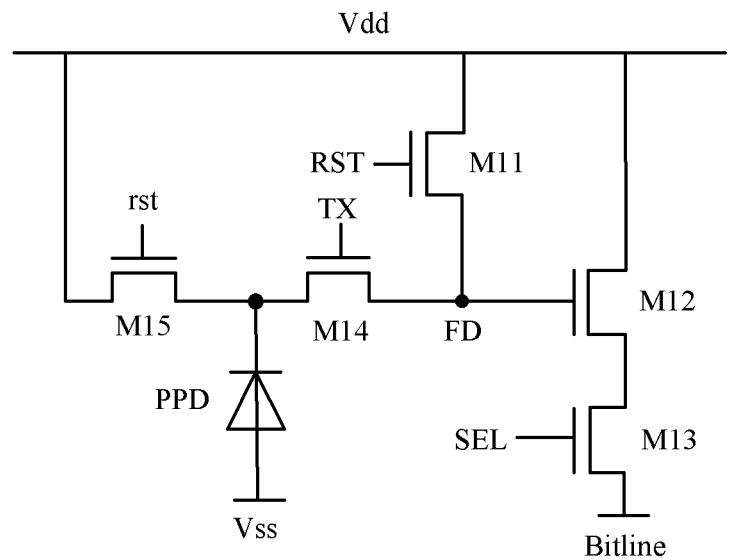
FIG. 1 schematically illustrates a structure diagram of a conventional pixel unit of a 5T-type global exposure CMOS image sensor.
Figure 2:
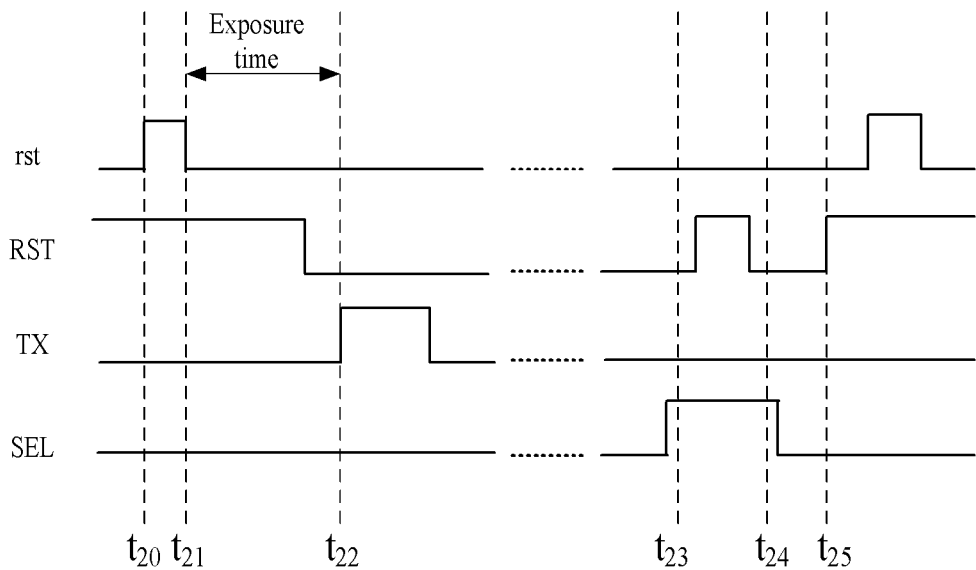
FIG. 2 schematically illustrates an operation timing diagram of the pixel unit shown in FIG. 1.
Figure 3:
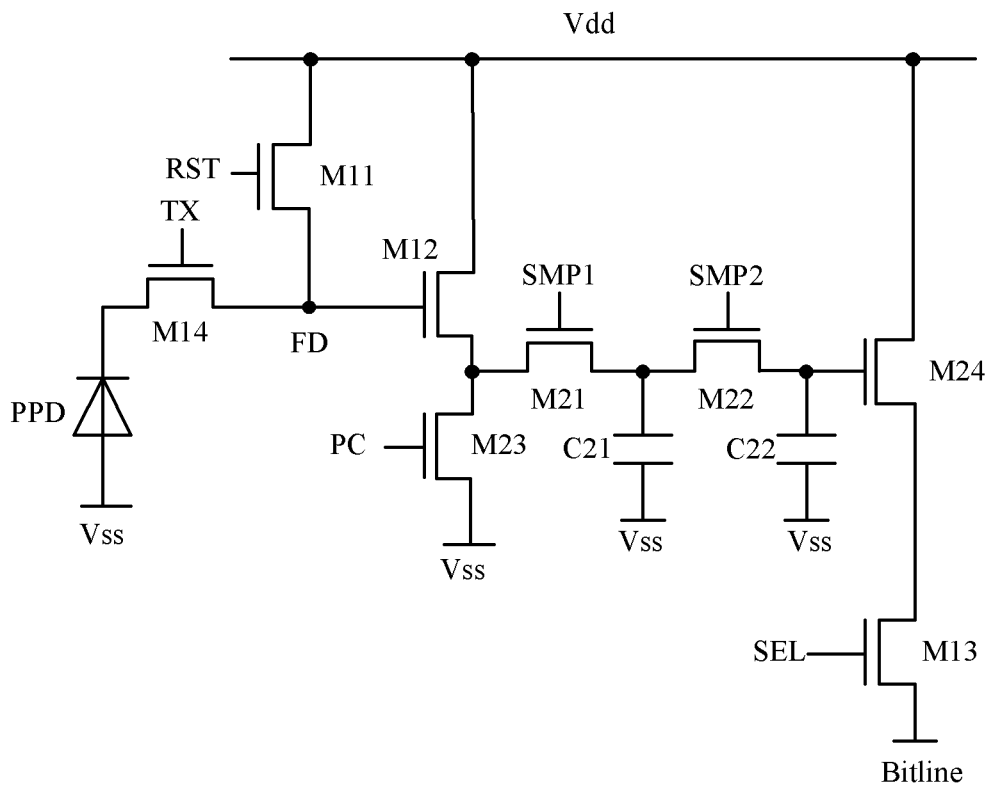
FIG. 3 schematically illustrates a structure diagram of a conventional pixel unit of a 8T-type global exposure CMOS image sensor.
Figure 4:
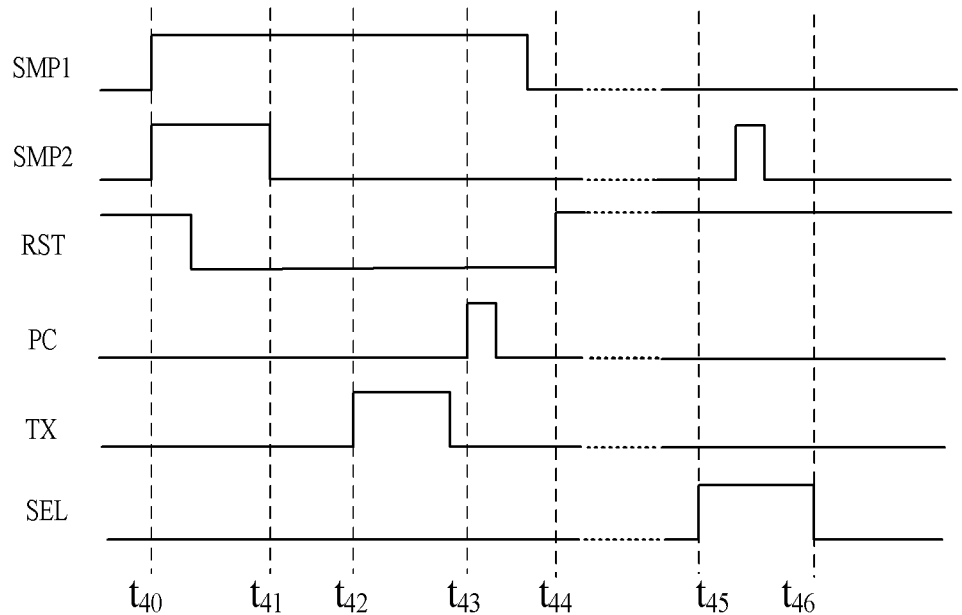
FIG. 4 schematically illustrates an operation timing diagram of the pixel unit shown in FIG. 3.
Figure 5:
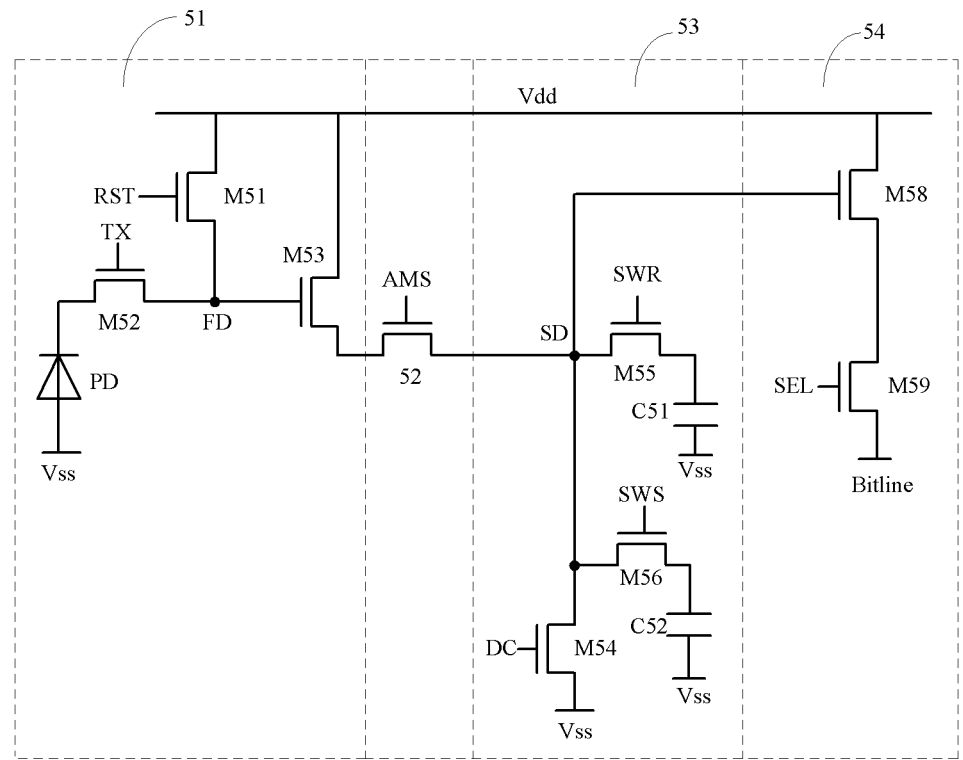
FIG. 5 schematically illustrates a structure diagram of a pixel unit of CMOS image sensor according to one embodiment of the present disclosure.

According to one embodiment of the present disclosure, a structure diagram of the pixel unit of CMOS image sensor is illustrated in FIG. 5. The pixel unit of CMOS image sensor may include a photoelectric conversion unit 51, an isolation transistor 52, a storage unit 53 and a reading unit 54.

The photoelectric conversion unit 51 includes a photoelectric conversion device PD, a first transistor M51, a second transistor M52 and a third transistor M53.

A first terminal of the first transistor M51 is adapted for connecting to a first power line Vdd.

A first terminal of the second transistor M52 is connected to a second terminal of the first transistor M51. A second terminal of the second transistor M52 is connected to a first terminal of the photoelectric conversion device PD.

A second terminal of the photoelectric conversion device PD is adapted for connecting to a second power line Vss. A voltage provided by the second power line Vss is lower than a voltage provided by the first power line Vdd. In this embodiment, the voltage provided by the first power line Vdd is a power source voltage for the CMOS image sensor, and ranges from 3V to 3.5V. The voltage provided by the second power line Vss is a ground voltage, and is 0V.

A first terminal of the third transistor M53 is adapted for connecting to the first power line Vdd, a second terminal of the third transistor M53 is connected to a first terminal of the isolation transistor 52, and a third terminal of the third transistor M53 is connected to the second terminal of the first transistor M51.

Because a distributed floating PN junction capacitance is formed between the second terminal of the first transistor M51 and ground, the second terminal of the first transistor M51 can serve as a storage node FD (namely, a floating diffusion area) for storing signals temporarily.

In this embodiment, the photoelectric conversion device PD is a photodiode. The first terminal of the photoelectric conversion device PD is a negative terminal of the photodiode, and the second terminal of the photoelectric conversion device PD is a positive terminal of the photodiode.

All the first transistor M51, the second transistor M52 and the third transistor M53 are NMOS transistors. The first terminals of the first transistor M51, the second transistor M52 and the third transistor M53 are drains of the NMOS transistors, the second terminals of the first transistor M51, the second transistor M52 and the third transistor M53 are sources of the NMOS transistors, and the third terminals of the first transistor M51, the second transistor M52 and the third transistor M53 are gates of the NMOS transistors.

A first terminal of the isolation transistor 52 is connected to the photoelectric conversion unit 51, and a second terminal of the isolation transistor 52 is connected to the storage unit 53 and the reading unit 54. In this embodiment, the isolation transistor 52 is an NMOS transistor, the first terminal of the isolation transistor 52 is a drain of the NMOS transistor, and the second terminal of the isolation transistor is a source of the NMOS transistor.

The storage unit 53 includes a first switch unit, a second switch unit, a first storage capacitor C51, a second storage capacitor C52 and a reset unit. The reset unit includes a fourth transistor M54, the first switch unit includes a fifth transistor M55, and the second switch unit includes a sixth transistor M56.

A first terminal of the fourth transistor M54 is connected the second terminal of the isolation transistor 52, and a second terminal of the fourth transistor M54 is adapted for connecting to the second power line Vss.

A first terminal of the fifth transistor M55 is connected to the second terminal of the isolation transistor 52, and a second terminal of the fifth transistor M55 is connected to a first terminal of the first storage capacitor C51.

A first terminal of the sixth transistor M56 is connected to the second terminal of the isolation transistor 52, and a second terminal of the sixth transistor M56 is connected to a first terminal of the second storage capacitor C52.

Both a second terminal of the first storage capacitor C51 and a second terminal of the second storage capacitor C52 are connected to the second power line Vss.

In this embodiment, all the fourth transistor M54, the fifth transistor M55 and the sixth transistor M56 are NMOS transistors. The first terminals of the fourth transistor M54, the fifth transistor M55 and the sixth transistor M56 are drains of the NOMS transistors, the second terminals of the fourth transistor M54, the fifth transistor M55 and the sixth transistor M56 are sources of the NMOS transistors, and the third terminals of the fourth transistor M54, the fifth transistor M55 and the sixth transistor M56 are gates of the NMOS transistors.

The reading unit 54 includes an eighth transistor M58 and a ninth transistor M59.

A first terminal of the eighth transistor M58 is adapted for connecting to the first power line Vdd, a second terminal of the eighth transistor M58 is connected to a first terminal of the ninth transistor M59, and a third terminal of the eighth transistor M58 is connected to the second terminal of the isolation transistor 52.

A second terminal of the ninth transistor M59 is adapted for connecting to the column selection line Bitline. The column selection line Bitline is adapted for transmitting signals output by the pixel unit of CMOS image sensor.

Both the eighth transistor M58 and the ninth transistor M59 are NMOS transistors. The first terminals of the eighth transistor M58 and the ninth transistor M59 are drains of the NMOS transistors, the second terminals of the eighth transistor M58 and the ninth transistor M59 are sources of the NMOS transistors, and the third terminals of the eighth transistor M58 and the ninth transistor M59 are gates of the NMOS transistors.

In this embodiment, all the transistors are NMOS transistors. It should be noted that, in other embodiments, PMOS transistors may be used to replace the NMOS transistors.

Figure 6:
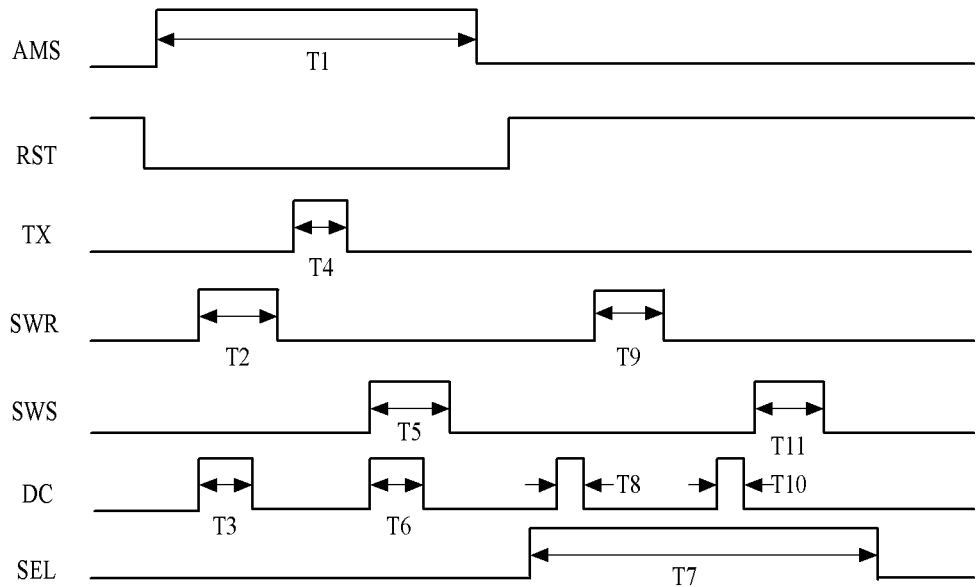
FIG. 6 schematically illustrates an operation timing diagram of the pixel unit shown in FIG. 5.

FIG. 6 illustrates an operation timing diagram of the pixel unit of CMOS image sensor described above, wherein AMS stands for an isolation control signal received by the gate of the isolation transistor 52, RST stands for a first reset control signal received by the gate of the first transistor M51, TX stands for a transmission signal received by the gate of the second transistor M52, SWR stands for a first switch signal for controlling the first switch unit, SWS stands for a second switch signal for controlling the second switch unit, DC stands for a second reset control signal for controlling the reset unit, and SEL stands for a row selection signal received by the gate of the ninth transistor M59.

Amplitudes of all the signals shown in FIG. 6 may be determined according to specific circuit configurations and device parameters. In this embodiment, when the isolation control signal AMS, the first reset control signal RST, the first switch signal SWR, the second switch signal SWS and the row selection signal SEL are high level signals, amplitudes of these signals may range from 3V to 3.8V. When the isolation control signal AMS, the first reset control signal RST, the first switch signal SWR, the second switch signal SWS and the row selection signal SEL are low level signals, amplitudes of these signals may be 0V. When the transmission signal TX is a high level signal, its amplitude may range from 3V to 3.8V, and when the transmission signal TX is a low level signal, its amplitude may range from −0.8V to 0.5V. When the second reset control signal DC is a high level signal, its amplitude may range from 0V to 1.8V, and when the second reset control signal DC is a low level signal, its amplitude may be 0V.

A working process of the pixel unit of CMOS image sensor described above will be described below in conjunction with FIG. 6.

Referring to FIG. 6, at a beginning of an operation period, the first reset control signal RST is a high level signal, such that the first transistor M51 is turned on to reset the storage node FD. Because the first terminal of the first transistor M51 is connected to the first power line Vdd and the first power line Vdd provides power source voltage for supplying the CMOS sensor, resetting the storage node FD means the storage node FD is charged, charges in the storage node FD is increased, and the storage node FD is charged to a high potential.

Before the photoelectric conversion device PD finishes the photoelectric conversion process, the first reset control signal RST is switched from a high level signal to a low level signal, such that the first transistor M51 is turned off and then the reset operation of the storage node FD is finish. After the reset operation, the storage node FD stores a reset signal V1.

In the time slot T1 after the reset operation for the storage node FD is finished, the isolation control signal AMS is switched from a low level signal to a high level signal, such that the isolation transistor 52 is turned on and then the photoelectric conversion unit 51 and the storage unit 53 are connected.

In the time slot T2 after the isolation transistor 52 is turned on, the first switch signal SWR is switched from a low level signal to a high level signal, such that the fifth transistor M55 is turn on, and the first storage capacitor C51 and the fourth transistor M54 are connected.

In the time slot T3 after the isolation transistor 52 is turned on, the second reset control signal DC is switched from a low level signal to a high level signal to reset the first storage capacitor C51. It should be noted that, in some embodiments, the second reset control signal DC and the first switch signal SWR may be switch from a low level signal to a high level signal at the same time, such that the fourth transistor M54 and the fifth transistor M55 can be turned on simultaneously; in some embodiments, the second reset control signal DC may be switched from a low level signal to a high level signal after the fifth transistor M55 is turned on, such that the fourth transistor is turned on later than the fifth transistor M55.

Because the second terminal of the fourth transistor M54 is connected to the second power line Vss and the second power line Vss provides the ground voltage, resetting the first storage capacitor C51 means the first storage capacitor C51 is discharged, charges in the first storage capacitor is emptied, and the voltage of the first terminal of the first storage capacitor C51 is set to the voltage provided by the second power line Vss.

Because the third transistor M53 is a source follower, its voltage gain is close to one. That is, a voltage of the source of the third transistor M53 follows a voltage of its gate. Therefore, when the first storage capacitor C51 is reset, even though the isolation transistor 52 is turned on and the source voltage of the third transistor M53 is changed, the gate voltage of the third transistor M53 (that is, the reset signal V1 stored in the storage node FD) will not change.

After the first storage capacitor C51 is reset, the second reset control signal DC is switched from a high level signal to a low level signal, such that the fourth transistor M54 is turned off. The first switch signal SWR maintains the high level signal, and the reset signal V1 is stored in the first storage capacitor C51 through the third transistor M53, the isolation transistor 52 and the fifth transistor M55.

Because the charges in the first storage capacitor C51 have been emptied before the reset signal V1 is stored, storing the reset signal V1 in the first storage capacitor C51 means charging the first storage capacitor C51 and increasing charges in the first storage capacitor C51, thus that the voltage of the first terminal of the first storage capacitor C51 is the same as the voltage of the reset signal V1. After the reset signal V1 has been stored, the first switch signal SWR is switched from a high level signal to a low level signal, such that the fifth transistor M55 is turned off.

In the time slot T4 after the reset signal V1 has been stored, the transmission signal TX is switched from a low level signal to a high level signal, such that the second transistor M52 is turned on and then the electrical signal obtained by the photoelectric conversion device PD is transmitted to the storage node FD.

When the photoelectric conversion device PD performs photoelectric conversion, a photocurrent is generated. Thus, after the photoelectric conversion is finished, charges in the first terminal of the photoelectric conversion device PD has changed, and after the second transistor M52 is turned on, charges in the storage node FD changes correspondingly. After receiving the signal obtained by photoelectric conversion of the photoelectric conversion device PD, the storage node FD stores an exposure signal V2. A difference between the reset signal V1 and the exposure signal V2 is an image signal generated by the pixel unit.

After the signal obtained by photoelectric conversion of the photoelectric conversion device PD has been transmitted to the storage node FD, the transmission signal TX is switched from a high level signal to a low level signal, such that the second transistor M52 is turned off, and the photoelectric conversion device PD can perform another round of photoelectric conversion.

In the time slot T5 after the second transistor M52 is turned off, the second switch signal SWS is switched from a low level signal to a high level signal, such that the sixth transistor M56 is turned on, and the second storage capacitor C52 and the fourth transistor M54 are connected.

In the time slot T6 after the second transistor M52 is turned off, the second reset control signal DC is switched from a low level signal to a high level signal to reset the second storage capacitor C52. It should be noted that, in some embodiments, the second reset control signal DC and the second switch signal SWS may be switched from a low level signal to a high level signal at the same time, such that the fourth transistor M54 and the sixth transistor M56 can be turned on simultaneously; in some embodiments, the second reset control signal DC may be switched from a low level signal to a high level signal after the sixth transistor M56 is turned on, such that the fourth transistor is turned on later than the sixth transistor M56.

Similarly to resetting the first storage capacitor C51, resetting the second storage capacitor C52 includes discharging the second storage capacitor C52 and emptying charges in the second storage capacitor C52, such that the voltage of the first terminal of the second storage capacitor C52 is the voltage provided by the second power line Vss. When the second storage capacitor C52 is reset, the exposure signal V2 stored in the storage node FD will not change.

After the second storage capacitor C52 has been reset, the second reset control signal DC is switched from a high level signal to a low level signal, such that the fourth transistor M54 is turned off. The second switch signal SWS maintains the high level signal, the exposure signal V2 is stored in the second storage capacitor C52 through the third transistor M53, the isolation transistor 52 and the sixth transistor M56.

Similarly to storing the reset signal V1 in the first storage capacitor C51, the exposure signal V2 is stored in the second storage capacitor C52. Namely, the second storage capacitor C52 is charged to increase charges stored in the second storage capacitor C52, such that the voltage of the first terminal of the second storage capacitor C52 is the voltage of the exposure signal V2. After the exposure signal V2 is stored, the second switch signal SWS is switched from a high level signal to a low level signal, such that the sixth transistor M56 is turned off.

After the exposure signal V2 is stored, the isolation control signal AMS is switched from a high level signal to a low level signal, such that the isolation transistor 52 is turned off. After the isolation transistor 52 is turned off, the storage unit 53 and the reading unit 53 is disconnected from the storage node FD. Therefore, the isolation transistor 52 can ensure the reading process of the reset signal V1 and the exposure signal V2 doesn't influence the reset process of the storage node FD and the photoelectric conversion process of the photoelectric conversion device PD. That is, the reset process of the storage node FD and the photoelectric conversion process of the photoelectric conversion device PD can be performed at any time, such that the frame rate can be increased.

After the isolation transistor 52 has been turned off, the first reset control signal RST is switched from a low level signal to a high level signal, such that the first transistor M51 is turned on, and the storage node FD is reset again.

In the time slot T7 after the isolation transistor 52 has been turned off, the row selection signal SEL is switched from a low level signal to a high level signal, such that the ninth transistor M59 is turned on, and the pixel unit starts the reading process of the reset signal V1 and the exposure signal V2.

In the time slot T8 after the ninth transistor M59 is turned on, the second reset control signal DC is switched from a low level signal to a high level signal, such that the fourth transistor M54 is turned on to reset a connection node SD of the isolation transistor 52 and the storage unit 53 and the reading unit 54. The connection node SD is reset in order to keep the same charges stored in the connection node SD in processes for reading the reset signal V1 and the exposure signal V2. Similarly to resetting the first storage capacitor C51, resetting the connection node SD includes discharging the connection node SD and emptying charges in the connection node SD.

After the connection node SD has been reset, the second reset control signal DC is switched from a high level signal to a low level signal, such that the fourth transistor M54 in the reset unit is turned off.

In the time slot T9 after the connection node SD has been reset, the first switch signal SWR is switched from a low level signal to a high level signal, such that the fifth transistor M55 is turned on, the first storage capacitor C51 is connected to the reading unit 54, the reset signal stored in the first storage capacitor C51 is read out to the column selection line Bitline through the fifth transistor M55, the eighth transistor M58 and the ninth transistor M59.

Because the charges in the connection node SD has been emptied before the reset signal V1 is read out, when reading the reset signal V1, the gate voltage of the eighth transistor M58 is the voltage of the reset signal V1. The eighth transistor M58 is a source follower, and voltages of its source and gate are the same.

After the reset signal V1 is read out to the column selection line Bitline, the first switch signal SWR is switched from a high level signal to a low level signal, such that the fifth transistor M55 is turned off.

In the time slot T10 after the reset signal V1 is readout to the column selection line Bitline, the second reset control signal DC is switched from a low level signal to a high level signal, such that the fourth transistor M54 is turned on, and the connection node SD is reset again. After the connection node SD has been reset, the second reset control signal DC is switched from a high level signal to a low level signal, such that the fourth transistor M54 in the reset unit is turned off.

In the time slot T11 after the connection node SD is reset again, the second switch signal SWS is switched from a low level signal to a high level signal, such that the sixth transistor M56 is turned on, the second storage capacitor C52 is connected to the reading unit 54, and the exposure signal V2 stored in the second storage capacitor C52 is read out to the column selection line Bitline through the sixth transistor M56, the eighth transistor M58 and the ninth transistor M59.

After the exposure signal V2 is read out to the column selection line Bitline, the second switch signal SWS is switched from a high level signal to a low level signal, such that the sixth transistor M56 is turned off.

After the sixth transistor M56 is turned off, the column selection signal SEL is switched from a high level signal to a low level signal, such that the ninth transistor M59 is turned off, and the pixel unit can start a new operation period.

It should be noted that, in this embodiment, the signal received by the gate of each transistor can be a high level signal or a low level signal; holding times of the high level signal and the low level signal, or durations of the time slots can be determined according to specific circuit configurations and device parameters. For example, in the time slot T3 after the isolation transistor 52 is turned on, the second reset control signal DC is switched from a low level signal to a high level signal to reset the first storage capacitor C51. The duration of the time slot T3 relates to the amount of charges stored in the first storage capacitor C51 and the amplitude of the high level of the second reset control signal DC. When the amount of charges stored in the first storage capacitor C51 is fewer and the amplitude of the high level of the second reset control signal DC is higher, the duration of the time slot T3 is shorter. On the contrary, when the amount of charges stored in the first storage capacitor C51 is more and the amplitude of the high level of the second reset control signal DC is lower, the duration of the time slot T3 is longer.

In this embodiment, in the processes for storing the signals, the first storage capacitor C51 is used to store the reset signal V1 and the second storage capacitor C52 is used to store the exposure signal V2. Moreover, because there is no mutual transfer between the charges stored in the first storage capacitor C51 and the charges stored in the second storage capacitor C52, in the processes for reading signals, neither the reset signal V1 read out from the first storage capacitor C51 nor the exposure signal V2 read out from the second storage capacitor C52 is attenuated. Therefore, SNR of the signals output by the pixel unit of CMOS image sensor is improved.

In the above embodiment, the reset unit includes the fourth transistor M54. The first terminal of the fourth transistor M54 is connected to the second terminal of the isolation transistor 52, the second terminal of the fourth transistor M54 is connected to the second power line Vss, and the reset voltage provided by the reset unit is the voltage provided by the second power line Vss, namely, 0V.

Figure 7:
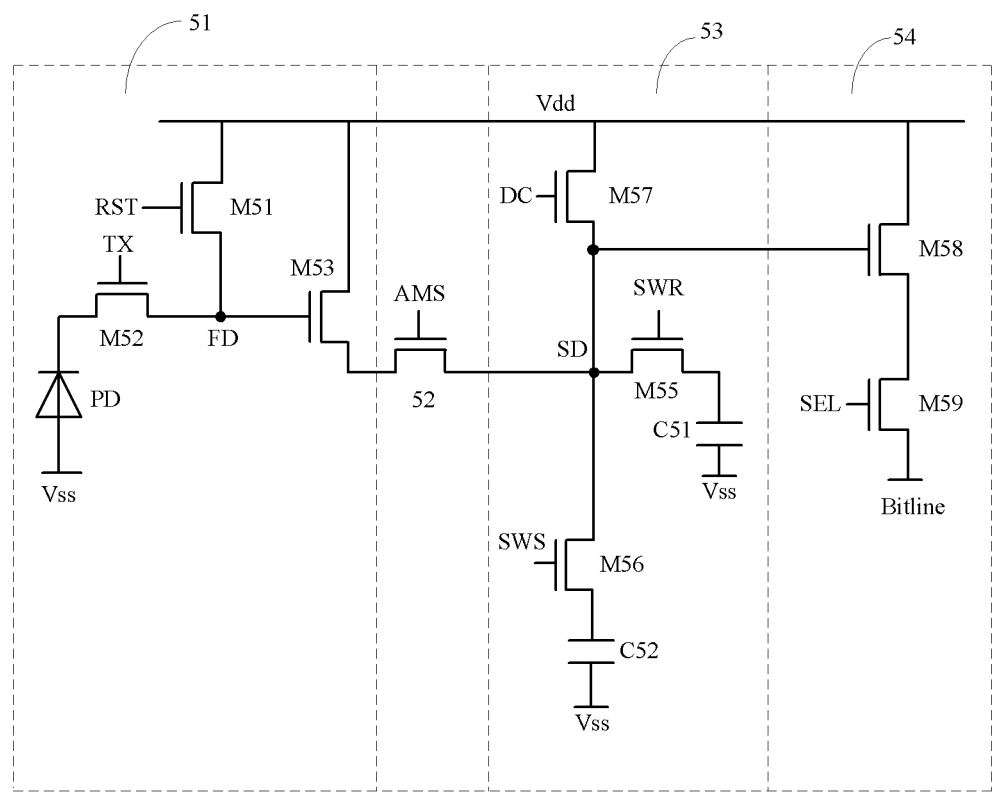
FIG. 7 schematically illustrates a structure diagram of a pixel unit of CMOS image sensor according to another embodiment of the present disclosure.

A structure diagram of a pixel unit of CMOS image sensor is illustrated in FIG. 7 according to another embodiment of the present disclosure. Referring to FIG. 7, a difference between this embodiment and the above embodiment is that the reset unit includes a seventh transistor M57. A first terminal of the seventh transistor M57 is connected to the first power line Vdd, a second terminal of the seventh transistor M57 is connected to the second terminal of the isolation transistor 52, and the reset voltage provided by the reset unit is the voltage provided by the first power line Vdd, namely, 3V~3.5V.

In this embodiment, resetting the first storage capacitor C51, the second storage capacitor C52 and the connection node SD means the first storage capacitor C51, the second storage capacitor C52 and the connection node SD are charged, charges in the first storage capacitor C51, the second storage capacitor C52 and the connection node SD are increased, and voltages of the first terminal of the storage capacitor C51, the second terminal of the second storage capacitor C52 and the connection node SD are the voltage provided by the first power line Vdd.

Compared with the above embodiment, in this embodiment, before reading the reset signal V1 and the exposure signal V2, resetting the connection node SD means the voltage of the connection node SD being charged to the voltage provided by the first power line Vdd. Therefore, in this embodiment, when reading the reset signal V1, a voltage read out to the column selection line Bitline is a sum of the voltage of the reset signal V1 and the voltage provided by the first power line Vdd, and when reading the exposure signal V2, a voltage read out to the column selection line Bitline is a sum of the voltage of the exposure signal V2 and the voltage provided by the first power line Vdd. Therefore, a difference between the two signals of the reading processes is still the difference between the reset signal V1 and the exposure signal V2, that is, the image signal generated by the pixel unit.

A control method for controlling the pixel unit of CMOS image sensor in this embodiment is similar to the method described in above embodiment. More detail about the method refers to the above embodiment, and is not described herein.

Figure 8:
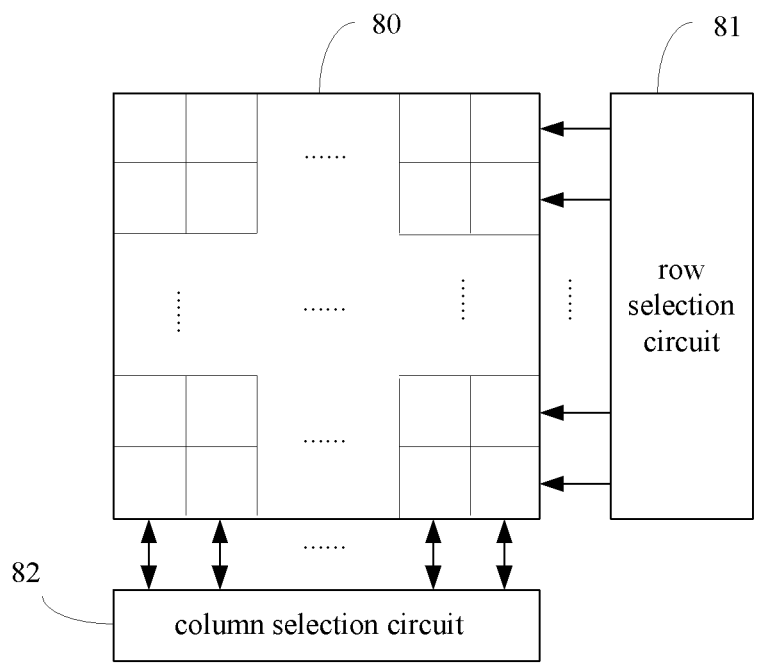
FIG. 8 schematically illustrates a structural diagram of a pixel unit of CMOS image sensor according to one embodiment of the present disclosure.

According to the above pixel unit of CMOS image sensor, a CMOS image sensor is also provided in embodiments of the present disclosure. Referring to FIG. 8, the CMOS image sensor includes a row selection circuit 81, a column selection circuit 82, and also a pixel array 80. The pixel array includes a plurality of pixel units arranged in an array. The pixel units are the same as described in above embodiments.

Specifically, the row selection circuit 81 is adapted for providing row selection signals to the pixel array 80, and the column selection circuit 82 is adapted for transmitting signals output by the pixel array 80.

In conclusion, in the process for reading out the reset signal and the exposure signal by the CDS technology, the pixel unit of CMOS image sensor provided by embodiments of the present disclosure can reduce the signal attenuation, and improve SNRs of the signals generated by the pixel unit.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A pixel unit of CMOS image sensor, comprising: a photoelectric conversion unit, an isolation transistor, a storage unit and a reading unit,
    wherein a first terminal of the isolation transistor is connected to the photoelectric conversion unit, a second terminal of the isolation transistor is connected to the storage unit and the reading unit, the first terminal is a source of the isolation transistor and the second terminal is a drain of the isolation transistor; and
    wherein the storage unit comprises a first switch unit, a second switch unit, a first storage capacitor, a second storage capacitor and a reset unit, wherein a first terminal of the first switch unit is connected to the first storage capacitor and is adapted for controlling the first storage capacitor to be charged or discharged, a first terminal of the second switch unit is connected to the second storage capacitor and is adapted for controlling the second storage capacitor to be charged or discharged, a second terminal of the first switch unit is connected to a second terminal of the second switch unit and the reading unit, and the reset unit is adapted for providing reset voltages for the first storage capacitor and the second storage capacitor.

2. The pixel unit of CMOS image sensor according to claim 1, wherein the isolation transistor is an NMOS transistor, the first terminal of the isolation transistor is a drain of the NMOS transistor, and the second terminal of the isolation transistor is a source of the NMOS transistor.

3. The pixel unit of CMOS image sensor according to claim 1, wherein the photoelectric conversion unit comprises a photoelectric conversion device, a first transistor, a second transistor and a third transistor, where a first terminal of the first transistor is adapted for connecting to a first power line; where a first terminal of the second transistor is connected to a second terminal of the first transistor, and a second terminal of the second transistor is connected to a first terminal of the photoelectric conversion device; where a second terminal of the photoelectric conversion device is adapted for connecting to a second power line, and a voltage provided by the second power line is lower than a voltage provided by the first power line; and where a first terminal of the third transistor is adapted for connecting to the first power line, a second terminal of the third transistor is connected to the first terminal of the isolation transistor, and a third terminal of the third transistor is connected to the second terminal of the first transistor.

4. The pixel unit of CMOS image sensor according to claim 3, wherein the photoelectric conversion device is a photodiode, the first terminal of the photoelectric conversion device is a negative terminal of the photodiode, and the second terminal of the photoelectric conversion device is a positive terminal of the photodiode.

5. The pixel unit of CMOS image sensor according to claim 3, wherein the first transistor, the second transistor and the third transistor are NMOS transistors, the first terminals of the first transistor, the second transistor and the third transistor are drains of the NMOS transistors, the second terminals of the first transistor, the second transistor and the third transistor are sources of the NMOS transistors, and the third terminal of the third transistor is a gate of the NMOS transistor.

6. The pixel unit of CMOS image sensor according to claim 3, wherein the reading unit comprises an eighth transistor and a ninth transistor, where a first terminal of the eighth transistor is adapted for connecting to the first power line, a second terminal of the eighth transistor is connected to a first terminal of the ninth transistor, and a third terminal of the eighth transistor is connected to the second terminal of the isolation transistor; and where a second terminal of the ninth transistor is adapted for connecting to a column selection line.

7. The pixel unit of CMOS image sensor according to claim 6, wherein both the eighth transistor and the ninth transistor are NMOS transistors, the first terminals of the eighth transistor and the ninth transistor are drains of the NMOS transistors, the second terminals of the eighth transistor and the ninth transistor are sources of the NMOS transistors, and the third terminal of the eighth transistor is a gate of the NMOS transistor.

8. The pixel unit of CMOS image sensor according to claim 6, wherein the reset unit comprises a fourth transistor, the first switch unit comprises a fifth transistor, and the second switch unit comprises a sixth transistor, where a first terminal of the fourth transistor is connected to the second terminal of the isolation transistor, and a second terminal of the fourth transistor is adapted for connecting to the second power line; where a first terminal of the fifth transistor is connected to the second terminal of the isolation transistor, and a second terminal of the fifth transistor is connected to a first terminal of the first storage capacitor; where a first terminal of the sixth transistor is connected to the second terminal of the isolation transistor, and a second terminal of the sixth transistor is connected to a first terminal of the second storage capacitor; and where both a second terminal of the first storage capacitor and a second terminal of the second storage capacitor are adapted for connecting to the second power line.

9. The pixel unit of CMOS image sensor according to claim 8, wherein the fourth transistor, the fifth transistor and the sixth transistor are NMOS transistors, the first terminals of the fourth transistor, the fifth transistor and the sixth transistor are drains of the NOMS transistors, and the second terminals of the fourth transistor, the fifth transistor and the sixth transistor are sources of the NMOS transistors.

10. The pixel unit of CMOS image sensor according to claim 6, wherein the first switch unit comprises a fifth transistor, and the second switch unit comprises a sixth transistor, the reset unit comprises a seventh transistor, where a first terminal of the seventh transistor is adapted for connecting to the first power line, and a second terminal of the seventh transistor is connected to the second terminal of the isolation transistor; where a first terminal of the fifth transistor is connected to the second terminal of the isolation transistor, and a second terminal of the fifth transistor is connected to a first terminal of the first storage capacitor; where a first terminal of the sixth transistor is connected to the second terminal of the isolation transistor, and a second terminal of the sixth transistor is connected to a first terminal of the second storage capacitor; and where both a second terminal of the first storage capacitor and a second terminal of the second storage capacitor are adapted for connecting to the second power line.

11. The pixel unit of CMOS image sensor according to claim 10, wherein the fifth transistor, the sixth transistor, and the seventh transistor are NMOS transistors, the first terminals of the fifth transistor, the sixth transistor and the seventh transistor are drains of the NOMS transistors, and the second terminals of the fifth transistor, the sixth transistor and the seventh transistor are sources of the NMOS transistors.

12. A method for controlling the pixel unit of CMOS image sensor according to claim 8, comprising:
at a beginning of an operation period, controlling the first transistor to be turned on, so as to reset the second terminal of the first transistor; and, after the second terminal of the first transistor has been reset, controlling the first transistor to be turned off;
in a first time slot after the first transistor has been turned off, controlling the isolation transistor to be turned on, such that the photoelectric conversion unit and the storage unit are connected;
in the first time slot, controlling the fifth transistor to be turned on in a second time slot, such that the first storage capacitor and the fourth transistor are connected;
in the second time slot, controlling the fourth transistor to be turned on in a third time slot, so as to reset the first storage capacitor; after the first storage capacitor has been reset, controlling the fourth transistor to be turned off, so as to store a reset signal of the second terminal of the first transistor in the first storage capacitor; and, after the reset signal has been stored, controlling the fifth transistor to be turned off;
in a fourth time slot which is in the first time slot and after the fifth transistor being turned off, controlling the second transistor to be turned on, so as to transmit a signal obtain by photoelectric conversion of the photoelectric conversion unit to the second terminal of the first transistor; and, after the signal obtain by photoelectric conversion is transmitted, controlling the second transistor to be turned off;
in a fifth time slot which is in the first time slot and after the second transistor being turned off, controlling the sixth transistor to be turned on, such that the second storage capacitor and the fourth transistor are connected;
in the fifth time slot, controlling the fourth transistor to be turned on in a sixth time slot, so as to reset the second storage capacitor; after the second storage capacitor is reset, controlling the fourth transistor to be turned off, so as to store an exposure signal of the second terminal of the first transistor to the second storage capacitor; and, after the exposure signal has been stored, controlling the isolation transistor to be turned off, such that the photoelectric conversion unit and the storage unit are disconnected;

after the photoelectric conversion unit and the storage unit are disconnected, controlling the first transistor to be turned on, so as to reset the second terminal of the first transistor again;

in a seventh time slot after the isolation transistor is turned off, controlling the ninth transistor to be turned on;

in the seventh time slot, controlling the fourth transistor to be turned on in an eighth time slot, so as to reset a connection node of the fifth transistor and the sixth transistor; and, after the connection node is reset, controlling the fourth transistor to be turned off;

in the seventh time slot and after the fourth transistor is turned off, controlling the fifth transistor to be turned on in a ninth time slot, so as to read the signal stored in the first storage capacitor out to the column selection line; and, after the signal stored in the first storage capacitor has been read out, controlling the fifth transistor to be turned off;

in the seventh time slot and after the fifth transistor has been turned off, controlling the fourth transistor to be turned on in a tenth time slot, so as to reset the connection node of the fifth transistor and the sixth transistor; and, after the connection node is reset, controlling the fourth transistor to be turned off; and in the seventh time slot and after the fourth transistor has been turned off, controlling the sixth transistor to be turned on in an eleventh time slot, so as to read the signal stored in the second storage capacitor out to the column selection line; after the signal stored in the second storage capacitor has been read out, controlling the sixth transistor to be turned off; and, after the sixth transistor is turned off, controlling the ninth transistor to be turned off and ending the operation period.

13. A method for controlling the pixel unit of CMOS image sensor according to claim 10, comprising:

at a beginning of an operation period, controlling the first transistor to be turned on, so as to reset the second terminal of the first transistor; and, after the second terminal of the first transistor has been reset, controlling the first transistor to be turned off;

in a first time slot after the first transistor has been turned off, controlling the isolation transistor to be turned on, such that the photoelectric conversion unit and the storage unit are connected;

in the first time slot, controlling the fifth transistor to be turned on in a second time slot, such that the first storage capacitor and the seventh transistor are connected;

in the second time slot, controlling the seventh transistor to be turned on in a third time slot, so as to reset the first storage capacitor; after the first storage capacitor has been reset, controlling the seventh transistor to be turned off, so as to store a reset signal of the second terminal of the first transistor in the first storage capacitor; and, after the reset signal has been stored, controlling the fifth transistor to be turned off;

in a seventh time slot which is in the first time slot and after the fifth transistor being turned off, controlling the second transistor to be turned on, so as to transmit a signal obtain by photoelectric conversion of the photoelectric conversion unit to the second terminal of the first transistor; and, after the signal obtained by photoelectric conversion is transmitted, controlling the second transistor to be turned off;

in a fifth time slot which is in the first time slot and after the second transistor being turned off, controlling the sixth transistor to be turned on, such that the second storage capacitor and the seventh transistor are connected;

in the fifth time slot, controlling the seventh transistor to be turned on in a sixth time slot, so as to reset the second storage capacitor; after the second storage capacitor is reset, controlling the seventh transistor to be turned off, so as to store an exposure signal of the second terminal of the first transistor to the second storage capacitor; and, after the exposure signal has been stored, controlling the isolation transistor to be turned off, such that the photoelectric conversion unit and the storage unit are disconnected;

after the photoelectric conversion unit and the storage unit are disconnected, controlling the first transistor to be turned on, so as to reset the second terminal of the first transistor again;

in a seventh time slot after the isolation transistor is turned off, controlling the ninth transistor to be turned on;

in the seventh time slot, controlling the seventh transistor to be turned on in an eighth time slot, so as to reset a connection node of the fifth transistor and the sixth transistor; and, after the connection node is reset, controlling the seventh transistor to be turned off;

in the seventh time slot and after the seventh transistor is turned off, controlling the fifth transistor to be turned on in a ninth time slot, so as to read the signal stored in the first storage capacitor out to the column selection line; and, after the signal stored in the first storage capacitor has been read out, controlling the fifth transistor to be turned off;

in the seventh time slot and after the fifth transistor has been turned off, controlling the seventh transistor to be turned on in a tenth time slot, so as to reset the connection node of the fifth transistor and the sixth transistor; and, after the connection node is reset, controlling the seventh transistor to be turned off; and in the seventh time slot and after the seventh transistor has been turned off, controlling the sixth transistor to be turned on in an eleventh time slot, so as to read the signal stored in the second storage capacitor out to the column selection line; after the signal stored in the second storage capacitor has been read out, controlling the sixth transistor to be turned off; and, after the sixth transistor is turned off, controlling the ninth transistor to be turned off and ending the operation period.

* * * * *